(12) United States Patent
Curtin et al.

(10) Patent No.: US 11,811,584 B2
(45) Date of Patent: Nov. 7, 2023

(54) SYSTEM AND METHOD FOR AUTOMATICALLY IDENTIFYING FAILURE IN SERVICES DEPLOYED BY MOBILE NETWORK OPERATORS

(71) Applicant: NETSCOUT SYSTEMS TEXAS, LLC, Westford, MA (US)

(72) Inventors: John P. Curtin, Richardson, TX (US); Vignesh Janakiraman, Plano, TX (US); Balaji Ratakonda, Dallas, TX (US)

(73) Assignee: Tektronix Texas, LLC, Westford, MA (US)

( * ) Notice: Subject to any disclaimer, the term of this patent is extended or adjusted under 35 U.S.C. 154(b) by 227 days.

(21) Appl. No.: 14/931,617

(22) Filed: Nov. 3, 2015

(65) Prior Publication Data

US 2017/0126476 A1    May 4, 2017

(51) Int. Cl.
| | |
|---|---|
| *H04L 41/0631* | (2022.01) |
| *H04L 41/5009* | (2022.01) |
| *H04L 69/40* | (2022.01) |
| *H04L 43/091* | (2022.01) |

(52) U.S. Cl.
CPC ...... *H04L 41/0631* (2013.01); *H04L 41/5009* (2013.01); *H04L 43/091* (2022.05); *H04L 69/40* (2013.01)

(58) Field of Classification Search
CPC . H04L 41/0631; H04L 69/40; H04L 41/5009; H04L 41/5019; H04L 67/141; H04W 4/005

See application file for complete search history.

(56) References Cited

U.S. PATENT DOCUMENTS

| | | | | |
|---|---|---|---|---|
| 9,667,476 | B2 * | 5/2017 | Benner | H04L 43/16 |
| 9,729,414 | B1 * | 8/2017 | Oliveira | H04L 43/062 |
| 9,965,758 | B2 * | 5/2018 | Zaidi | G06Q 20/382 |
| 2005/0289219 | A1 * | 12/2005 | Nazzal | H04L 63/1408 709/203 |
| 2007/0115860 | A1 * | 5/2007 | Samele | H04Q 3/0087 370/259 |
| 2008/0317217 | A1 * | 12/2008 | Bernardini | H04L 41/0873 379/32.03 |
| 2009/0181665 | A1 * | 7/2009 | Sater | H04L 41/5064 455/424 |
| 2009/0196186 | A1 * | 8/2009 | Lidstrom | H04L 41/14 370/241 |
| 2013/0166730 | A1 * | 6/2013 | Wilkinson | H04L 43/0852 709/224 |

(Continued)

*Primary Examiner* — Dhairya A Patel
*Assistant Examiner* — Eui H Kim
(74) *Attorney, Agent, or Firm* — Foley & Lardner LLP

(57) ABSTRACT

A network monitoring system is provided that includes a processor and a memory coupled to the processor. A plurality of services provided by a network operator is identified. A plurality of Key Performance Indicators (KPIs) associated with the identified plurality of services is calculated on a per service basis. Individual services provided by the network operator are characterized based on the calculated plurality of KPIs. A root cause of service level failures for one or more of the plurality of services is identified, in response to determining that at least one of the characterized service levels does not meet predefined service level objectives for the one or more of the plurality of services.

4 Claims, 3 Drawing Sheets

(56) References Cited

U.S. PATENT DOCUMENTS

| | | | |
|---|---|---|---|
| 2013/0301431 A1* | 11/2013 | Izzo | H04L 41/5067 370/252 |
| 2015/0016274 A1* | 1/2015 | Holland | H04L 43/0847 370/242 |
| 2015/0281004 A1* | 10/2015 | Kakadia | H04L 41/0816 370/235 |
| 2015/0288557 A1* | 10/2015 | Gates | G06F 11/0709 714/37 |
| 2016/0080248 A1* | 3/2016 | Rijnders | H04L 41/5019 709/224 |
| 2016/0103838 A1* | 4/2016 | Sainani | H04L 41/5045 707/725 |

* cited by examiner

SYSTEM AND METHOD FOR AUTOMATICALLY IDENTIFYING FAILURE IN SERVICES DEPLOYED BY MOBILE NETWORK OPERATORS

FIELD OF THE INVENTION

The present invention elates, in general, to network monitoring, and more particular V to systems and methods for automatically identifying failure in services deployed by mobile network operators.

BACKGROUND OF THE INVENTION

Network and customer experience monitoring solutions are widely accepted standards for the operations of carrier service provider networks across both fixed networks (e.g., Cable/Multi System Operator (MSO), IP broadband such as Digital Subscriber Line (DSL), Fiber To Home (FTTH), etc.) and mobile networks (e.g., second and a half generation (2.5G), third generation (3G), fourth generation (4G), 3GPP Long Term Evolution (LTE), etc.). These systems monitor network traffic via probe devices, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business process.

A few examples of KPIs include Handover Success (by node, location, etc.), Call Drop Ratio (by node, handset, etc.), Application Usage (by node, subscriber, etc.), Subscriber Count (by location, demographic, etc.), and the like.

Most existing measuring and monitoring solutions provide a wide range of service level KPIs that are based on user defined services such as Hyper Text Transfer Protocol (HTTP), Voice and Video. For some services such as Voice and Video, existing methods define computing MOS (Mean Opinion Scores) as a measure of user's quality of experience using client side applications or estimating the MOS scores based on what client reports via control protocols such as Real-time Transport Protocol (RTP) Control Protocol (RTCP) and RTCP Extended Reports (XR). Such KPI's are used for providing root cause analysis for well-known services. However, there are several other services that network operators offer for both their subscribers and their enterprise business customers, such as business-to-business (b2b), business-to-consumer (b2c), consumer-to-business (c2b) or consumer-to-consumer (c2c) services or events.

Hence, while there are currently known monitoring solutions that provide a wide range of KPIs, those systems do not automatically detect b2b, b2c, c2b or c2c services, for example, and thus those systems do not provide root cause analysis of failures to such services.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a network monitoring system is provided that includes a processor and a memory coupled to the processor. The memory is configured to store program instructions executable by the processor to cause the network monitoring system to identify a plurality of services provided by a network operator and to calculate a plurality of Key Performance Indicators (KPIs) associated with the identified plurality of services on a per service basis. The program instructions executable by the processor also cause the network monitoring system to characterize service levels of individual services provided by the network operator based on the calculated plurality of KPIs and to identify a root cause of service level failures for one or more of the plurality of services, in response to determining that at least one of the characterized service levels does not meet predefined service level objectives for the one or more of the plurality of services.

In another aspect, a method for automatically identifying failure in network services deployed by one or more network operators is provided. A plurality of services provided by a network operator is identified. A plurality of Key Performance Indicators (KPIs) associated with the identified plurality of services is calculated on a per service basis. Individual services provided by the network operator are characterized based on the calculated plurality of KPIs. A root cause of service level failures for one or more of the plurality of services is identified, in response to determining that at least one of the characterized service levels does not meet predefined service level objectives for the one or more of the plurality of services.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
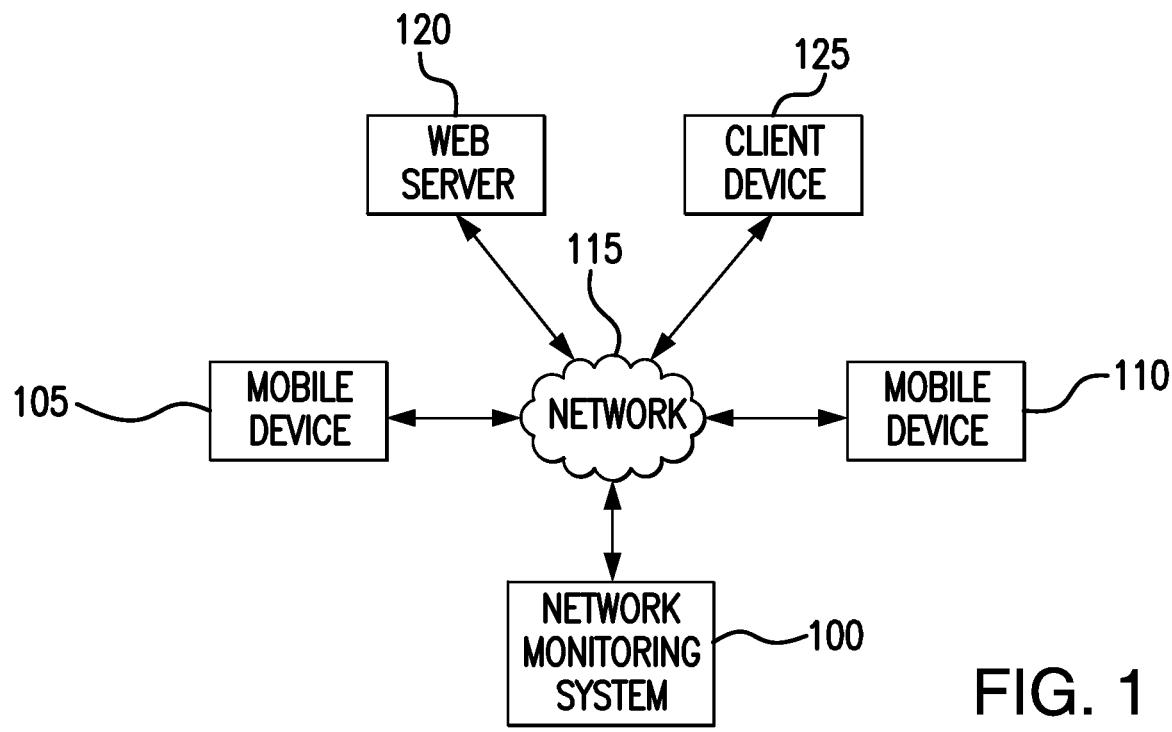
FIG. 1 is a block diagram of a network monitoring system according to some embodiments of the present invention.

The below illustrated embodiments are directed to a system and method for automatically identifying failure in services deployed by mobile network operators in which a component or a feature that is common to more than one illustration is indicated with a common reference. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably utilized in conjunction with a software algorithm, program or code residing on computer useable medium having control logic for enabling execution on a device having a computer processor. The device typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the certain embodiments described herein. Thus, the certain embodiments are not to be understood to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

FIG. 1 illustrates a block diagram of a network monitoring system. As illustrated, mobile devices 105 and 110 may be capable of transmitting and receiving data (e.g., web pages, audio, video, etc.) to and from each other over network 115. Also, web server 120 may be configured to provide one or more web pages to client device 125 through network 115. In various embodiments, network 115 may include any suitable wired or wireless/mobile computer or data network including, for example, a 3G, 4G, or LTE wireless networks, a voice-over-IP (VoIP) network, an IP Multimedia Subsystem (IMS) network, the Internet, etc.

Communications between mobile devices 105 and 110, as well as communications between web server 120 and client device 125, may be monitored by network monitoring system 100, as data packets comprising those communications pass through network 115. As such, network monitoring system 100 may include a network monitor or analyzer, a packet sniffer, a probe, or the like, coupled to network 115. Protocols used to enable communications taking place in FIG. 1 may be selected, for instance, based upon the type of content being communicated, the type of network 115, and/or the capabilities of devices 105, 110, and/or 125. Examples of types of protocols that may be used include, but are not limited to, HTTP, Real Time Messaging Protocol (RTMP), and RTP.

Each communication session for the various devices 105, 110, and/or 125 may have different start and stop times, and may be subject to different network traffic constraints. During each session, the available bandwidth for that session may change multiple times. Also, a data stream may start and stop during a given session.

Accordingly, network monitoring system 100 may be configured to sample (e.g., unobtrusively) related data packets for a communication session in order to track the same set of user experience information for each service, each session and each client without regard to the protocol (e.g., HTTP, RTMP, RTP, etc.) used to support the session. Various embodiments of the present invention further contemplate that network 115 can optionally further provide other services, such as, but not limited to, e-commerce, retail, media & entertainment, business, government, sports, travel & hospitality, real estate, educational services, sport services, entertainment shopping services, online gambling services, online penny and online auction services, business center services, social network, website or affiliate services. Generally speaking, such services may include business-to-business (b2b), business-to-consumer (b2c), consumer-to-business (c2b) or consumer-to-consumer (c2c) services or events. According to some embodiments, network monitoring system 100 may be configured to automatically identify a plurality of services provided by a network operator and may track and analyze particular user experience information pertaining to the provided set of services. For example, by calculating and/or presenting service specific KPIs monitoring system 100 may be capable of identifying certain service failures and service degradation for any type of services, as described in more detail below. A service provider may use this information, for instance, to reduce mean time to repair failures and/or adjust conventional network facilities available to client devices 105, 110, and/or 125 such as the bandwidth assigned to each user, and the routing of data packets through network 115.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out voice communications, navigate the Internet or other data networks using a web browser application or the like via a Graphical User Interface (GUI), etc. Additionally or alternatively, client device 125 may access a content catalog made available by web server 120 through a stand-alone or web-based client application. Web server 120 may include any server or computer system capable of delivering content to device 125.

Although only devices 105, 110, 120, and 125 are shown in FIG. 1, it will be understood network 115 may comprise any number of elements (i.e., nodes and endpoints). For example, in some implementations, network 115 may include nodes or endpoints that may be components in a 3G or 4G wireless network, such as a Serving General Packet Radio Service (GPRS) Support Node (SGSN), Gateway GPRS Support Node (GGSN) or Border Gateway in a GPRS network, Packet Data Serving Node (PDSN) in a Code Division Multiple Access (CDMA) 2000 network, a Mobile Management Entity (MME), eNodeB, Serving Gateway (SGW) in a LTE network or any other core network nodes or routers that transfer data packets or messages between endpoints. Moreover, it will be understood that such nodes and endpoints may be interconnected in any suitable manner, including being coupled to one or more other such nodes and/or endpoints.

As noted above, many packets traverse network 115 between endpoints. These packets may represent many different sessions and protocols. For example, if mobile device 105 is used for a voice or video call, then it may exchange Voice over Internet Protocol (VoIP) or Session Initiation Protocol (SIP) data packets with a SIP/VoIP server (not shown) using RTP. If mobile device 105 is used to send or retrieve email, it may exchange Internet Message Access Protocol (IMAP), Post Office Protocol 3 Protocol (POP3), or Simple Mail Transfer Protocol (SMTP) messages with an email server (not shown). If client device 105 is used to download or stream video, it may use Real Time Streaming Protocol (RTSP) to establish and control media sessions with web server 120. Alternatively, the user at mobile devices 105 and 110 or client device 125 may access a number of websites using HTTP protocol to exchange data packets with web server 120. It will be understood that packets exchanged between devices may conform to numerous other protocols now known or later developed.

In a typical situation, approximately one percent of the packets traversing network 115 carry control data, such as information for setting-up, managing or tearing-down calls or sessions between endpoints. The other ninety-nine percent of the packets carry user data, such as actual voice, video, email or information content to and from connected devices.

In various embodiments, network monitoring system 100 may be used to monitor the performance of network 115. To that end, monitoring system 100 may be configured to capture packets that are transported across network 115. In some embodiments, packet capture devices may be non-intrusively coupled to network links to capture substantially all of the packets transmitted across the links. It will be understood that, in an actual network, there may be dozens or hundreds of physical, logical or virtual connections and links between nodes. In some cases, network monitoring system 100 may be coupled to all or a high percentage of these links. In other embodiments, monitoring system 100 may be coupled only to a portion of network 115, such as only to links associated with a particular carrier or service provider. The packet capture devices may be part of network monitoring system 100, such as a line interface card, or may be separate components that are remotely coupled to network monitoring system 100 from different locations.

Monitoring system 100 may include one or more processors running one or more software applications that collect, correlate and/or analyze media and signaling data packets from network 115. Monitoring system 100 may incorporate protocol analyzer, session analyzer, and/or traffic analyzer functionality that provides OSI (Open Systems Interconnection) Layer 2 to Layer 7 troubleshooting by characterizing IP traffic by links, nodes, applications, service types and servers on network 115. In some embodiments, these operations may be provided, for example, by the IRIS® toolset available from NetScout Inc., although other suitable tools may exist or be later developed. The packet capture devices coupling network monitoring system 100 to network 115 may be high-speed, high-density probes that are optimized to handle high bandwidth IP traffic, such as the GEO-PROBE® G10, also available from NetScout, Inc., although other suitable tools may exist or be later developed. A service provider or network operator may access data from monitoring system 100 via a user interface station having a display or graphical user interface, such as the IRISVIEW configurable software framework that provides a single, integrated platform for several applications, including feeds to customer experience management systems and operation support system (OSS) and business support system (BSS) applications, which is also available from NetScout, Inc., although other suitable tools may exist or be later developed.

Monitoring system 100 may further comprise an internal or external memory for storing captured data packets, user session data, and configuration information. Monitoring system 100 may capture and correlate the packets associated with specific data sessions. In some embodiments, related packets may be correlated and combined into a record for a particular flow, session or call on network 115. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 100 may be configured to sample (e.g., unobtrusively) related data packets for a communication session in order to track the same set of user experience information for each service, each session and each client without regard to the protocol (e.g., HTTP, RTMP, RTP, etc.) used to support the service. For example, monitoring system 100 may be capable of identifying certain information about each user's experience with respect to a particular service, as described in more detail below. Generally speaking, with ever increasing consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

As the capability of network 115 increases toward 10 Gigabits/second (Gbps) and beyond (e.g., 100 Gbps), however, it supports more services, users' flows and sessions. As such, it becomes difficult for a service provider or network operator to analyze all the traffic across network 115, for example, to identify problem nodes or links. Some systems may collect all the data for a relatively short period of time, hoping that the sample taken is representative. Other systems may collect a percentage of network traffic all the time and attempt to extrapolate the data for the entire network by simply scaling it. To address these and other concerns, certain systems and methods described herein may enable the adaptive monitoring of telecommunications networks.

Figure 2:
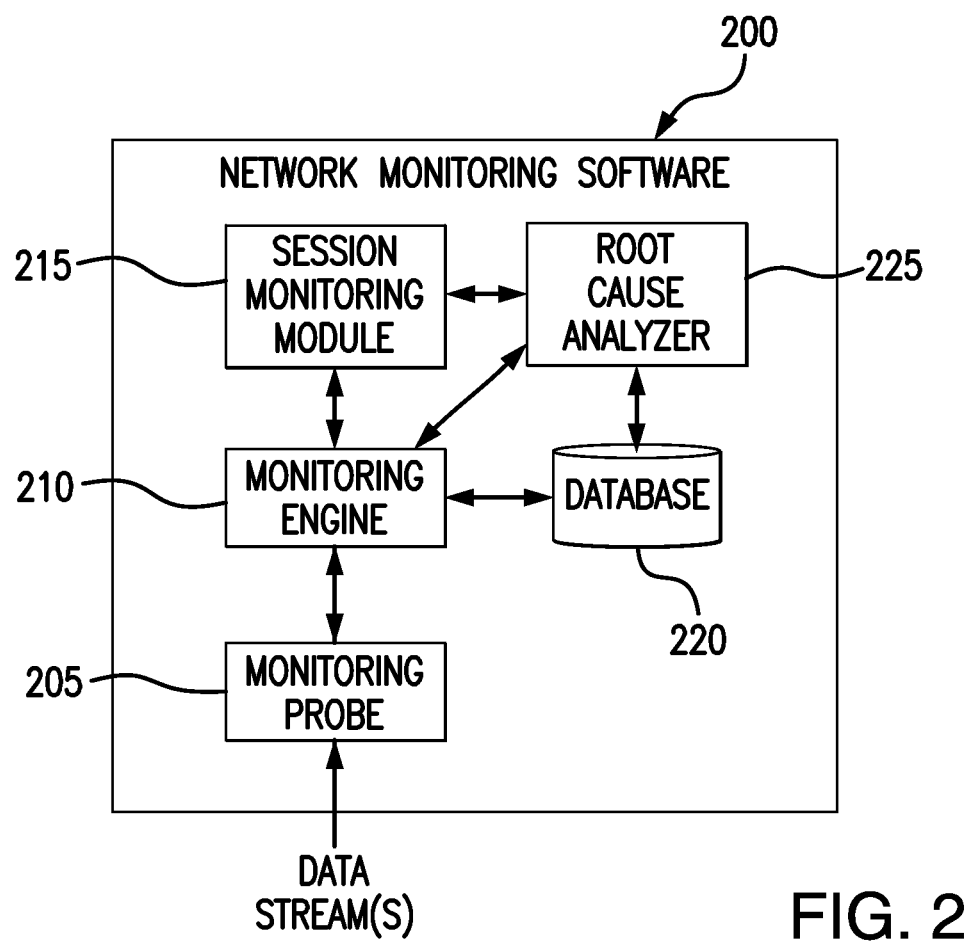
FIG. 2 is a block diagram of a network monitoring software program according to some embodiments of the present invention.

Turning now to FIG. 2, a block diagram of a network monitoring software program is depicted. In some embodiments, network monitoring software 200 may be a software application executable by monitoring system 100 of FIG. 1. As previously noted, a plurality of communication sessions or data streams may be transmitted across network 115 between devices 105, 110, 120, and/or 125. Such communications may be streamed over HTTP, RTMP, RTP, or any other suitable protocols.

Monitoring probe 205 may be configured to capture data packets from network 115, including, for example, data from one or more HTTP requests or sessions. As such, monitoring probe 205 may determine service identifying information for the captured data packets and may combine related data into session or request records. Monitoring probe 205 may then feed session records and captured packet data to monitoring engine 210. In some cases, a session record may include multiple segments that are provided to monitoring engine 210 periodically while an associated session is active. Monitoring engine 210 may in turn be configured to extract session data from each session record and to identify the protocol for each session record.

Session data may be provided as a monitoring feed to session monitoring module 215 and/or may be stored to database 220. Database 220 may also store subscriber information and client device data.

Network monitoring software 200 may allow the service provider for network 115 to collect data from various HTTP requests or sessions concurrently or simultaneously. Data for multiple requests or sessions is stored in database 220, which allows the service provider to track each service or to extract system-wide parameters. For example, monitoring probe 205 and/or monitoring engine 210 may identify the type of protocol being used for each session by analyzing the header of one or more data packets for that session.

Monitoring probe 205 and/or monitoring engine 210 may also track the bandwidth available to each service session, and may identify bandwidth changes that occur in real-time. Moreover, monitoring probe 205 and/or monitoring engine 210 may detect when gaps or missing fragments occur in the stream of data packets for any of the requests or sessions. The requests or service parameters, bandwidth information, and gap data may be collected to database 200 and/or presented to the service provider.

Data stored in database 220 may be queried by the service provider, for example, on a per-service, per-session, per-user, per-device, or per-protocol basis. Session monitoring module 210 may use the collected information to generate QoE and KPIs for each b2b, b2c, c2b or c2c service and for the overall network. The KPIs may be based, for example, on how often re-buffering, screen resolution changes, gaps, and/or missing fragments are detected. Excessive buffering during the session (i.e. re-buffering), numerous screen resolution changes, and gaps in the service stream may lower a user's QoE.

Referring back to FIGS. 1 and 2, network monitoring system 100 may be configured via network monitoring software 200 to monitor a programmable fraction of the network traffic that it is tapped into (e.g., 10 Gbps, 100 Gpbs, etc.). Such a programmable portion may be defined, for example, by a sampling ratio or the like. In some cases, monitoring probe 205 and/or engine 210 may analyze traffic intelligently to distinguish high-value traffic from low-value traffic (or any other selected forms of traffic) based on a set of heuristics. Examples of such heuristics may include, but are not limited to, traffic having a common source or destination address, a common subscriber identifier, a common transport protocol, a common port number, a common content type, etc. Depending upon the different type of traffic, a different sampling rule (or set of rules) may apply. Each rule may in turn dictate a portion of that traffic that will be used in subsequent processing such as, for example, the calculation of KPIs on a per service basis or the like.

Additional examples of service-based KPIs may include, but are not limited to, connection establishment indicators, service performance indicators, authentication indicators, network congestion indicators, connection maintenance indicators, service completion indicators, service quality indicators, and/or service availability indicators.

Network monitoring system 100, under control of software 200, may also be configured to aggregate data to enable backhauling, to generate netflows and basic KPI calculations, time stamping of data, port stamping of data, filtering out unwanted data, protocol classification, and deep packet inspection (DPI) analysis. In addition, network monitoring system 100, may be further configured to perform analysis of data, extraction of key parameters for call correlation and generation of call data records (CDRs), application specific processing, service specific processing, etc.

In operation, monitoring engine 210 may be configured to receive load information (e.g., CPU and/or memory usage) and to store that information in database 220. In various embodiments, KPIs that influence quality of the classified services provided by network 115 may be calculated by monitoring engine 210 as described with respect to FIG. 3 below. Monitoring engine 210 may also be configured to exchange information with a root cause analyzer 225. The exemplary root cause analyzer 225 of FIG. 2 analyzes the data, parameters and/or information collected by the monitoring probes 205 and service-specific calculated and analyzed KPI data to determine and/or identify the root cause(s) of identified service performance problems.

Figure 3:
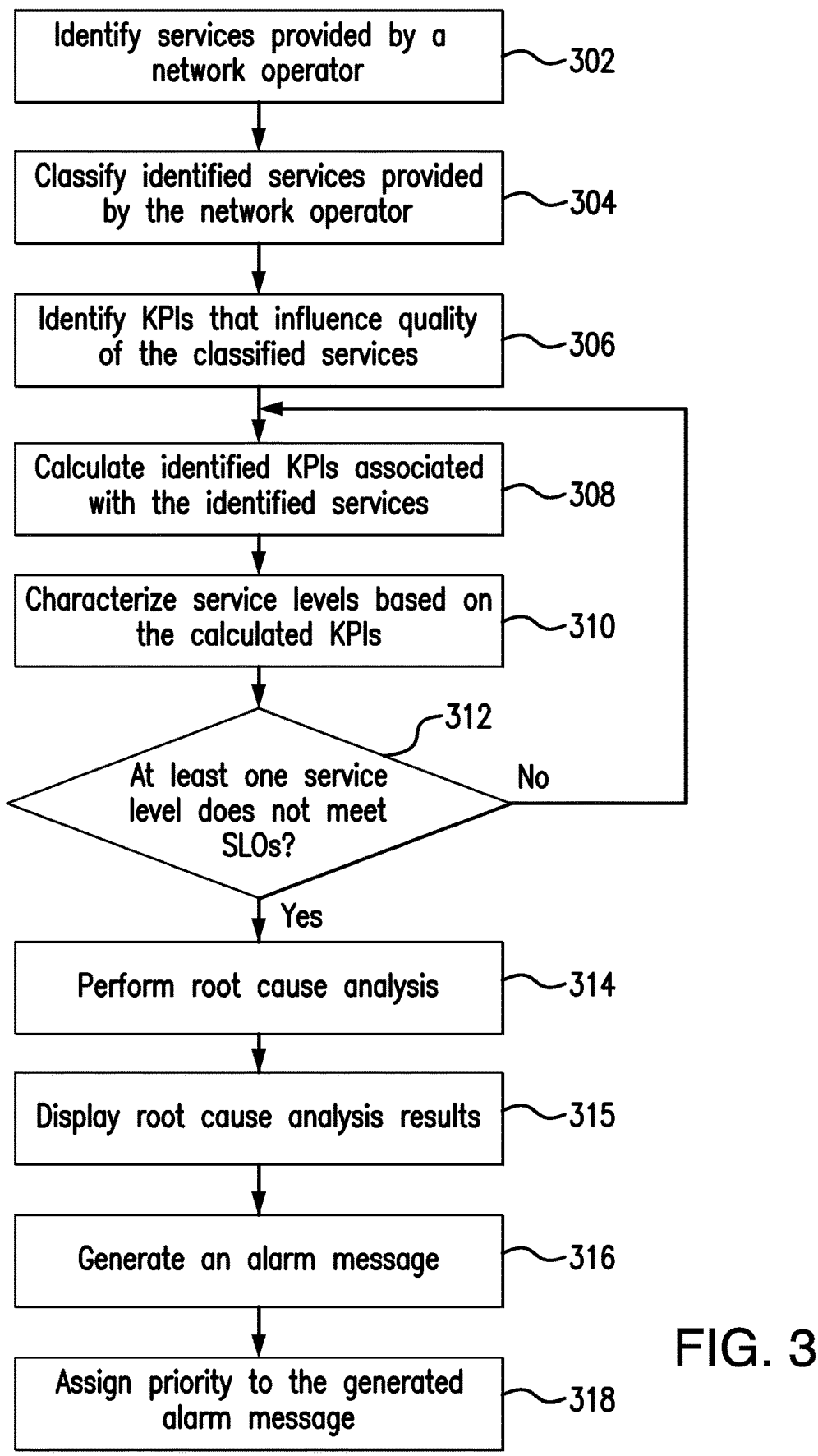
FIG. 3 is a flowchart of a method of automatically identifying failure in services deployed by mobile network operators, according to some embodiments of the present invention.

Referring now to FIG. 3, a flowchart of a method for automatically identifying failures in services deployed by mobile network operators is shown, in accordance with embodiments of the present invention. Before turning to description of FIG. 3, it is noted that the flow diagram in FIG. 3 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product. In some embodiments, the method described below may be performed, at least in part, by one or more components of network monitoring system 100.

According to an embodiment of the present invention, at step 302, monitoring engine 210 may detect and identify various services that are offered by network operators. Some non-limiting examples of b2c services that may be offered by telecommunications network operators include eCommerce/mobile payments services, mobile entertainment services, location-based services, and the like. Moreover, some non-limiting examples of b2b services may include Push-to-Talk and other unified communication services, mobile health services and vertical specific services (e.g., transportation, manufacturing, construction, etc.). In one embodiment, monitoring engine 210 may obtain a predefined list with the services currently being offered in network 115 from database 220 where such list is stored and maintained. In another embodiment, monitoring engine 210 may employ a dynamic service discovery process configured to probe various network elements to automatically detect the plurality of services offered in network 115.

In certain embodiments, monitoring engine 210 may be further configured, at step 304, to dynamically classify network services identified in step 302 according to any number and/or combination of attributes such as physical interface (e.g. port, slot), network protocol (e.g. IP, ARP), content source and destination identifiers (e.g., IP addresses), one or more wireless network nodes (e.g., Access Point Name (APN)), interface type (e.g. Ethernet), one or more QoS (Quality of Service) parameters, Layers 4 through 7 information (e.g. context-dependent, application-level, etc.), any arbitrary header content and/or payload content, session, environmental conditions, and any other type of deep-packet processing information. In addition, monitoring engine 210 may associate each classification with a specific type of service being offered, such as streaming and conversational services. For example, online video streaming may include popular services such as YouTube and Hulu. Video recording and video conferencing may include services such as Skype, FaceTime and Google Hangout. In accordance with the embodiments of the present invention, at step 304, monitoring engine 210 assigns a unique global identifier to each service that is detected on the network 115. Global identifiers attributed to detected services permit monitoring engine 210 to uniquely reference each set of KPIs that is related to a corresponding service. Table 1 below illustrates exemplary classification profiles for different services in accordance with aspects of the present invention:

TABLE 1

| Service | Classification Type | Classification Attribute | Unique Service ID |
|---|---|---|---|
| NFL Live | Streaming Video | IP Addresses | 1 |
| Fleet Tracking | Data | APN | 2 |
| FaceTime | Conversational Video | QoS | 3 |

According to an embodiment of the present invention, in order to detect degradation in performance of the services provided over network 115, at step 306, monitoring engine 210 is configured to identify one or more KPIs that influence quality of each service detected on the network 115. It is noted that various network parameters affect the KPIs. For example, a particular link can be active while still having intermittent errors. In other words, the link may have an error rate (such as a bit error rate) that can be non-negligible but still provide an operative communications interface. In this case, the link may not be disconnected, but the poor link quality may result in lost signaling messages and consequently affect the KPIs of the base station that uses it. KPIs such as network service accessibility rate, authentication success rate, call setup success rate, soft handover success rate, and positioning accuracy may be indicative of quality of location-based services, such as vehicle tracking services, mobile commerce when taking the form of coupons or advertising directed at customers based on their current location, personalized weather services, fraud detection, road-side assistance and even location-based games. Other KPIs that may be used to determine QoE of interactive gaming services include, but are not limited to, a packet loss rate, throughput measurements, dropped connections rate, application round-trip response time, retransmission rate, and the like. In some embodiments, KPIs relevant to a particular wireless technology such as a wireless access bearer establishment success rate, RRC (Radio Resource Control) connection establishment success rate and call completion rate may be utilized by monitoring engine 210 as service quality indicative KPIs. KPIs are expressed as numerical values and generally these values are expressed as ranges, upper limits, lower limits or percentages.

Next, at step 308, once a plurality of KPIs relevant to a plurality of detected network services is identified, monitoring engine 208 calculates values for the plurality of identified KPIs based on various data stored in database 220. In one embodiment, this calculation step includes assigning a unique service identifier (i.e., Unique Service ID in the Table 1 above) to each calculated KPI which is then stored with each calculated KPI value and/or data event. Using this information, all the KPI data that relate to a particular service can be drilled down to, i.e., found, in the storage. Since these KPI values all have the ID of the corresponding service, the exact set of them can be found in database 220.

According to an embodiment of the present invention, at step 310, monitoring engine 210 is preferably configured to characterize service levels based on the KPI values calculated in step 308. For example, in this step monitoring engine 210 compares the calculated KPI values with target values, to render off-target KPIs. In one embodiment, monitoring engine 210 may evaluate higher level KPIs that represent characteristics for a specific network service such as Internet Protocol Television (IPTV). In some embodiments, these higher level KPIs are capable of directly characterizing the end-user service. Access time and total frame freezes during a time period are examples of such KPIs for IPTV service. As noted above, normally, various network level problems can cause variations in KPI values. For example packet losses or jitter can cause frame freezes leading to variation of KPIs related to frame freezes. Furthermore, each KPI measures only one aspect of service performance. At least in some embodiments the overall service performance can be expressed using a so-called QoS metric specific to a particular service which combines several KPIs of the same service. In an alternative embodiment, monitoring engine 210 may characterize service levels based on collected historical data that is stored in database 220. It is noted various user-defined Service Level Objectives (SLOs) specific to each service may be pre-configured and stored in database 220. Subsequently, at step 310, monitoring engine 210 may characterize service levels by correlating the SLO(s) with the historical data and with the calculated KPI values.

According to an embodiment of the present invention, at step 312, the characterizations of service levels obtained in step 310 can be used to monitor whether the SLOs are being fulfilled. For example, one possible SLO could define that video streaming delay be no longer than 10 ms, and that a breach occurs if more than five 10 ms delays occur during a given period. SLOs, therefore, represent other means of quantifying network service performance through measurable service-specific KPI metrics such as availability, throughput, response time, quantity, and the like. Furthermore, a given SLO can have a single KPI or multiple KPIs. In response to determining that all SLOs are being fulfilled for all detected services (decision block 312, "no" branch), monitoring engine 210 returns back to steps 308 and 310.

In response to determining that at least one service level does not fulfill user-defined SLOs (decision block 312, "yes" branch), at 314, monitoring engine 210 initiates a root cause analysis relevant to services identified as failing to fulfill SLOs or falling below any other quality measurement thresholds described above. As noted above, to perform root cause analysis for the example network 115 of FIG. 1, the example network monitoring system 100 of FIG. 1 includes a root cause analyzer module 225. The exemplary root cause analyzer 225 of FIG. 2 analyzes the data, parameters and/or information collected by the monitoring probes 205 and service-specific KPI data calculated and characterized in steps 308 and 310 to determine and/or identify the root cause(s) of identified service performance problems. In one embodiment, root cause analyzer 225 may be invoked by monitoring engine 210 and may identify the root cause(s) by implementing, applying and/or carrying out one or more rules that are defined, specified and/or provided by one or more network operator(s), network designer(s) and/or other user(s) associated with network 115. In such embodiment, initially, one or more users provide, specify and/or defines an initial set of rules that root cause analyzer 225 applies, implements and/or uses to identify root cause(s) of identified network service problems or events (i.e., failed SLOs). Advantageously, root cause analyzer 225 may perform the root cause analysis by combining and correlating various service-specific KPIs to determine various network elements and/or applications impacting corresponding service quality. At step 315, root cause analyzer 225 sends results to monitoring engine 210, which in turn displays the root cause analysis results to a user via a user interface, for example.

According to an embodiment of the present invention, at step 316, monitoring engine 210 may optionally provide alarm reporting (e.g., issuing of notifications, such as email alerts, short messaging service (SMS) alerts, IP protocol messages, display of alarm messages at a control console, etc.). Such alarm reporting may be based upon the root cause analysis performed by root cause analyzer 225. Additionally or alternatively, such alarm reporting may be adapted to accommodate various operational service-specific scenarios. For example, alarm reporting logic of monitoring engine 210 may implement one or more service-based alarm conditions, such as network element throughput alarm, device latency alarm, and the like.

When the alarm message is generated, according to the illustrated embodiment, monitoring engine 210 assigns a priority level associated with the service failure type to the generated alarm. In some embodiments, monitoring engine 210 assigns a priority automatically using a rules-based algorithm. For example, a priority level can be assigned based on how many of a specific number of predetermined criteria are met. Such criteria can be tailored to take into account such factors as the number of various network elements and applications having an impact on the service failure type, and/or the type of service feature. In a specific example, the users may experience problems while watching NFL Live service on their smartphones via particular segment of provider's network. The service could be impacted by performance of network elements such as eNodeB, MME and SGW that the users are connected to. Alternatively, it is possible that the detected service failure might be related to a particular device type that the NFL Live service is running on. Thus, in this example, the generated alarm message may be ranked based on whether the service is being impacted by the network element or the device to determine its severity. In other words the alarm message priority may be determined by monitoring engine 210 based on which kind of technical equipment is concerned, relating to the impact of the detected failure on the functionality of the telecommunications network as a whole or relating to the impact on other services provided by the network, as shown in Table 2 below:

TABLE 2

| Detected service issue | Alarm Type | Sample KPIs | Alarm Criticality |
|---|---|---|---|
| NFL Live application not working properly | Network Element Throughput Alarm | eNodeB throughput < 1 Mbps | Medium |
|  | Device Latency Alarm | device latency > 50 ms | High |

Advantageously, the disclosed embodiments of the present invention enable automatic failure identification in services deployed by mobile network operators by employing customized service specific KPIs. Furthermore, the disclosed embodiments contemplate alarming users on provisioned services based on detected failures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
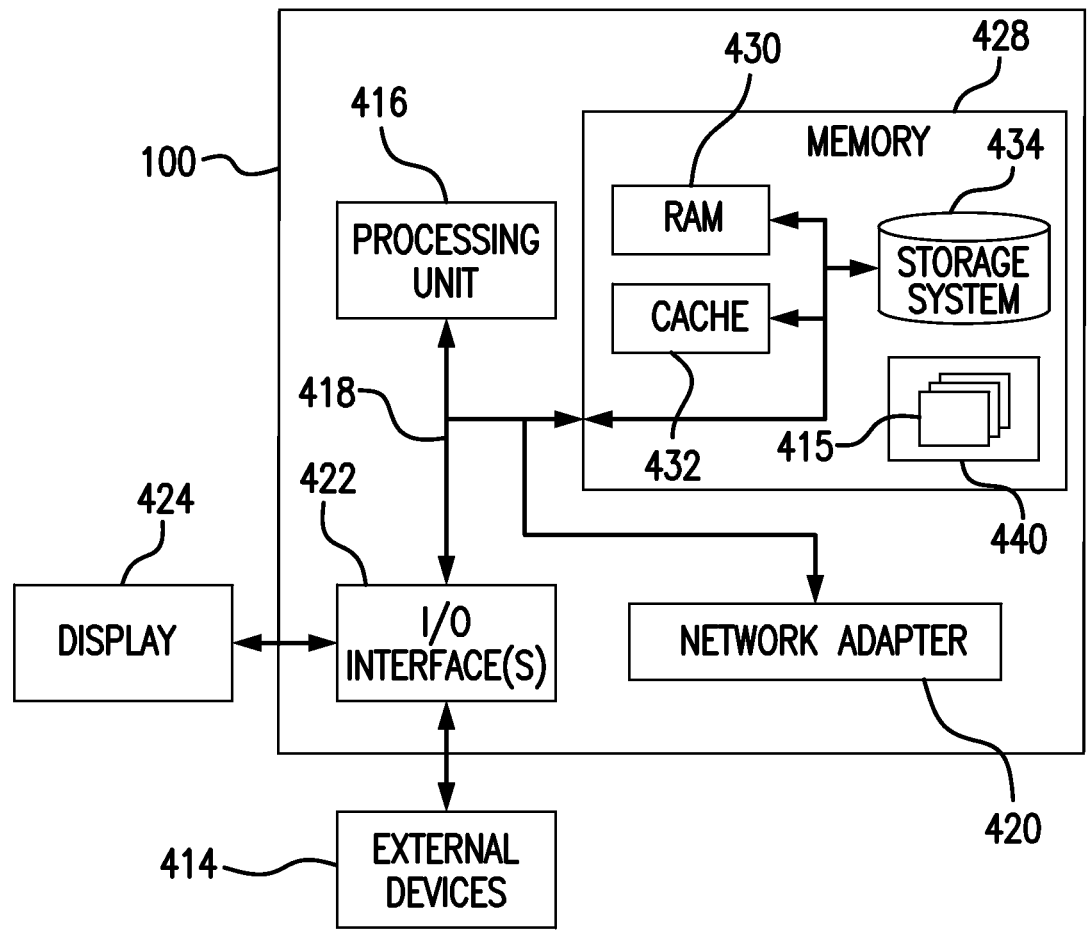
FIG. 4 is a block diagram of a computer system configured to implement various methods described herein according to some embodiments of the present invention.

Embodiments of the network monitoring system may be implemented or executed by one or more computer systems. One such computer system, the network monitoring system 100 is illustrated in FIG. 4. In various embodiments, network monitoring system 100 may be a server, a distributed computer system, a workstation, a network computer, a desktop computer, a laptop, or the like.

Network monitoring system 100 is only one example of a suitable system and is not intended to suggest any limitation as to the scope of use or functionality of embodiments of the invention described herein. Regardless, network monitoring system 100 is capable of being implemented and/or performing any of the functionality set forth hereinabove.

Network monitoring system 100 is operational with numerous other general purpose or special purpose computing system environments or configurations. Examples of well-known computing systems, environments, and/or configurations that may be suitable for use with the network monitoring system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of network monitoring system 100 may be described in the general context of computer system-executable instructions, such as program modules, being executed by a computer system. Generally, program modules may include routines, programs, objects, components, logic, data structures, and so on that perform particular tasks or implement particular abstract data types. Network monitoring system 100 may be practiced in distributed data processing environments where tasks are performed by processing devices that are linked through a communications network. In a distributed data processing environment, program modules may be located in both local and remote computer system storage media including memory storage devices.

The network monitoring system 100 is shown in FIG. 4 in the form of a general-purpose computing device. The components of network monitoring system 100 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network monitoring system 100 typically includes a variety of computer system readable media. Such media may be any available media that is accessible by network monitoring system 100, and it includes both volatile and non-volatile media, removable and non-removable media.

System memory 428 can include computer system readable media in the form of volatile memory, such as random access memory (RAM) 430 and/or cache memory 432. Network monitoring system 100 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 415 (such as monitoring probe 205, monitoring engine 210, session monitoring module 215 and root cause analyzer 225) may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Network monitoring system 100 may also communicate with one or more external devices such as a keyboard, a pointing device, a display, etc.; one or more devices that enable a user to interact with network monitoring system 100; and/or any devices (e.g., network card, modem, etc.) that enable network monitoring system 100 to communicate with one or more other computing devices. Such communication can occur via Input/Output (I/O) interfaces 422. Still yet, network monitoring system 100 can communicate with one or more networks such as a local area network (LAN), a general wide area network (WAN), and/or a public network (e.g., the Internet) via network adapter 420. As depicted, network adapter 420 communicates with the other components of network monitoring system 100 via bus 418. It should be understood that although not shown, other hardware and/or software components could be used in conjunction with network monitoring system 100. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network monitoring system for detecting service failures by mobile devices in a telecommunications network, comprising:
a network monitoring probe coupled to a telecommunications network configured to capture data packets from the telecommunications network and combine related data packets into generated session records, wherein each session record includes multiple segments;
a network monitoring device coupled to the network monitoring probe configured to analyze and generate alarms regarding a segment of a generated session record while the session record is active, the network monitoring device including:
a processor; and
a memory coupled to the processor, the memory configured to store program instructions executable by the processor to cause the network monitoring system to:
store user preconfigured Service Level Objectives (SLOs) specific to a plurality of network services in one or more databases;
identify a plurality of services provided by a network operator based upon analysis of a segment of a session record while the session record is active, wherein to identify a plurality of services provided by a network operator, the program instructions are further executable by the processor to cause the network monitoring system to classify the plurality of services based on Internet Protocol (IP) addresses, Access Point Names (APN), Quality of Service (QoS) or combination thereof;
assign a unique global identifier to each identified service in a data repository wherein the unique global identifier is stored in association with: 1) a service identifier name; 2) classification type description; and 3) classification attribute for an identified service;
calculate a plurality of Key Performance Indicators (KPIs) associated with the identified plurality of services on a per service basis, wherein each KPI value is stored together with the associated assigned unique global identifier in the data repository, wherein to calculate a plurality of KPIs associated with the identified plurality of services, the program instructions are further executable by the processor to cause the network monitoring system to identify a set of KPIs that indicate quality of the identified plurality of services;
characterize one or more service levels of individual services provided by the network operator based on the stored plurality of KPIs by correlating the preconfigured SLOs with historical data and with the calculated KPI values and comparing the calculated KPI values with target values to render off-target KPIs;
create Call Detail Records (CDRs) by categorizing messages in the captured data packets, via a call trace application;
analyze the captured data to categorize between high-value captured network traffic and low- value network traffic present in the captured data based upon a set of heuristics;
identify a root cause of service level failures for one or more of the plurality of services, in response to determining that at least one of the characterized service levels does not meet predefined service level objectives for the one or more of the plurality of services wherein the service level failures comprise one or more failures to meet predefined SLOs stored in the one or more databases such that service levels are characterized by correlating SLOs with collected historical data and with the calculated KPI values;
generate an alarm message including the one or more of the plurality of services based on the identified root cause and the calculated plurality of KPIs; and including a priority level to the alarm message, the priority level calculated based on the kind of technical equipment, impact of the service level failure, and impact on other services provided by the network.

2. The network monitoring system of claim 1, wherein the plurality of services provided by the network operator include business-to-business (b2b), business-to-consumer (b2c), consumer-to-business (c2b) or consumer-to-consumer (c2c) services or events.

3. The network monitoring system of claim 1, wherein to identify a plurality of services provided by a network operator, the program instructions are further executable by the processor to cause the network monitoring system to automatically detect the plurality of services provided by the network operator.

4. The network monitoring system of claim 1, wherein the alarm message includes information related to at least one of network elements, network applications or devices that influence quality of the one or more of the plurality of services.

\* \* \* \* \*